United States Patent
Fujimori

(10) Patent No.: US 9,715,236 B2
(45) Date of Patent: Jul. 25, 2017

(54) FORKLIFT OPERATION ASSIST SYSTEM

(71) Applicant: KABUSHIKI KAISHA TOYOTA JIDOSHOKKI, Kariya-shi, Aichi-ken (JP)

(72) Inventor: Hiroyuki Fujimori, Aichi-ken (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 0 days.

(21) Appl. No.: 15/227,574

(22) Filed: Aug. 3, 2016

(65) Prior Publication Data

US 2017/0038779 A1    Feb. 9, 2017

(30) Foreign Application Priority Data

Aug. 6, 2015   (JP) .................. 2015-156494

(51) Int. Cl.
| | | |
|---|---|---|
| B64C 39/00 | (2006.01) | |
| B05D 1/00 | (2006.01) | |
| G05D 1/10 | (2006.01) | |
| B64C 39/02 | (2006.01) | |
| B64D 47/08 | (2006.01) | |
| G05D 1/00 | (2006.01) | |

(52) U.S. Cl.
CPC ........... *G05D 1/102* (2013.01); *B64C 39/024* (2013.01); *B64D 47/08* (2013.01); *G05D 1/0094* (2013.01); *G05D 1/101* (2013.01); *B64C 2201/108* (2013.01); *B64C 2201/127* (2013.01); *G05D 2201/0216* (2013.01)

(58) Field of Classification Search
CPC combination set(s) only.
See application file for complete search history.

(56) References Cited

U.S. PATENT DOCUMENTS

| | | | | |
|---|---|---|---|---|
| 2011/0082668 A1* | 4/2011 | Escrig | .................. | G05D 1/0246 703/1 |
| 2012/0083947 A1* | 4/2012 | Anderson | ............. | B60W 30/09 701/3 |
| 2012/0109610 A1* | 5/2012 | Anderson | ............. | B60W 30/09 703/8 |
| 2014/0032017 A1* | 1/2014 | Anderson | ............. | B60W 30/09 701/3 |

FOREIGN PATENT DOCUMENTS

| | | |
|---|---|---|
| JP | 2003-246597 A | 9/2003 |
| JP | 2007-320734 A | 12/2007 |
| JP | 2012-171024 A | 9/2012 |

* cited by examiner

*Primary Examiner* — Yonel Beaulieu
(74) *Attorney, Agent, or Firm* — Sughrue Mion, PLLC

(57) ABSTRACT

A forklift operation assist system includes a forklift truck having a load-handling device with a lifting portion, a small unmanned aerial vehicle that is mountable on the forklift truck and has an image capture device, and a display device that presents images captured by the image capture device. The forklift truck includes a vehicle controller that is electrically connected to the display device. The small unmanned aerial vehicle includes an aircraft controller that communicates with the vehicle controller. The small unmanned aerial vehicle takes off the forklift truck when a lifting operation of the lifting portion is detected. The display device presents the images captured by the image capture device while the aerial vehicle is flying.

5 Claims, 6 Drawing Sheets

FORKLIFT OPERATION ASSIST SYSTEM

BACKGROUND OF THE INVENTION

The present invention relates to an operation assist system that assists in the load-handling operation of a forklift truck. More particularly, the invention relates to an operation assist system having a small unmanned aerial vehicle (SUAV) for use with a forklift truck.

Japanese Unexamined Patent Application Publication No. 2007-320734 discloses a forklift operation assist system.

The forklift operation assist system includes an ID tag provided on a conveyor, a tag reader provided on the forklift truck, an operation monitoring camera that captures from above an image of a place on the conveyor on which a load is placed, and a vehicle monitor provided in an operator's compartment of the forklift truck. The forklift operation assist system is adapted, when communication between the tag reader on the forklift truck and the ID tag is established, to activate the operation monitoring camera that is associated with the ID tag, cause the tag reader to read identification information of the ID tag, and activate the vehicle monitor. The forklift operation assist system is also adapted to identify the operation monitoring camera associated with the ID tag that is in communication with the tag reader and cause the vehicle monitor to present images received from the identified operation monitoring camera. According to the forklift operation assist system disclosed in the above Japanese Unexamined Patent Application Publication No. 2007-320734 that allows forklift truck operator to observe the entire operation area of handling the load on the conveyor, the load-handling operation can be performed efficiently and safely, which helps to reduce the labor costs.

Further, as another conventional forklift operation assist system, there is disclosed in Japanese Unexamined Patent Application Publication No. 2003-246597 a camera system for use with a forklift truck. In the forklift truck having this camera system, a groove is provided at the front tip end of the fork of the forklift truck and a camera for capturing the front view of the forklift truck is mounted in the groove. The signal of the video image that is captured by the camera is transmitted through a coaxial cable to a display device mounted in front of the driver's seat. The video image signal thus transmitted through the coaxial cable is used to present a video image on the display device. According to the camera system for use in the forklift truck disclosed in the Publication, a blind spot in front of the forklift truck is eliminated and to thereby provide safe operation and improved operation efficiency of the forklift truck.

In the forklift operation assist system disclosed in Japanese Unexamined Patent Application Publication No. 2007-320734, however, each conveyor needs to be provided with an ID tag and an operation monitoring camera for capturing an image of the area where a load is present. In other words, the forklift operation assist system disclosed in the above Publication is disadvantageous in that an increase in the number of conveyors will require an increasing number of ID tags, monitoring cameras, and other related equipment, and hence a larger setup, thereby making the system large in size.

In the camera system for a forklift truck disclosed in Japanese Unexamined Patent Application Publication No. 2003-246597, there is a problem that the camera provided in the front tip end of the fork is susceptible to contamination and may be damaged easily due to impact. Still further, the camera system of this type may produce a blurred image due to the vibration of the forklift truck.

The present invention which has been made in view of the above problems is directed to providing a forklift operation assist system that does not require a large setup and is capable of providing effective assistance for load-handling operation of the forklift truck.

SUMMARY OF THE INVENTION

In accordance with an aspect of the present invention, there is provided a forklift operation assist system that includes a forklift truck having a load-handling device with a lifting portion, a small unmanned aerial vehicle (SUAV) that is mountable on the forklift truck and has an image capture device, and a display device that presents images captured by the image capture device. The forklift truck includes a vehicle controller that is electrically connected to the display device. The small unmanned aerial vehicle (SUAV) includes an aircraft controller that communicates with the vehicle controller. The small unmanned aerial vehicle (SUAV) takes off the forklift truck when a lifting operation of the lifting portion is detected. The display device presents the images captured by the image capture device while the aerial vehicle is flying.

Other aspects and advantages of the invention will become apparent from the following description, taken in conjunction with the accompanying drawings, illustrating by way of example the principles of the invention.

DETAILED DESCRIPTION OF THE EMBODIMENTS

The following will describe a forklift operation assist system according to an embodiment of the present invention with reference to the accompanying drawings. It is to be noted that in the following description, the positional expressions such as front, rear, right, left, up, and down will refer to the positions as viewed from an operator of the forklift truck being seated on an operator's seat in an operator's compartment and facing in the forward traveling direction of the forklift truck.

Figure 1:
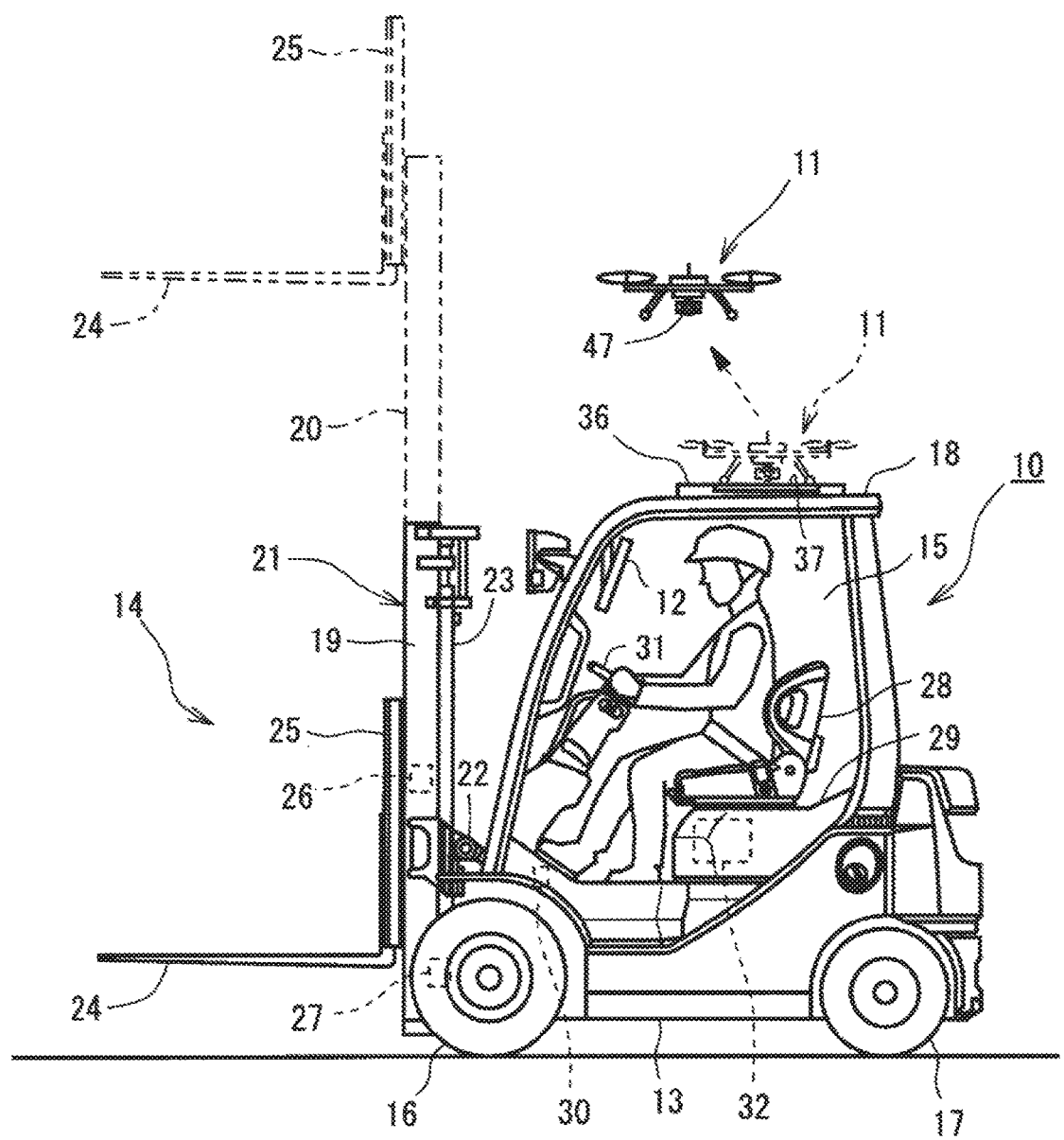
FIG. 1 is a side view showing a forklift operation assist system according to an embodiment of the present invention.

Referring to FIG. 1, the forklift operation assist system according to the present embodiment includes a forklift truck 10, a rotary-wing unmanned aircraft system (hereinafter, the rotary-wing UAS) 11 as the small unmanned aerial vehicle (SUAV) of the present invention that is mountable or landable on the forklift truck 10, and a vehicle monitor 12 that is equipped in the forklift truck 10 and corresponds to the display device of the present invention.

The forklift truck 10 includes a vehicle body 13 and a load-handling device 14 that is coupled to the front of the vehicle body 13. An operator's compartment 15 is provided in the center of the vehicle body 13.

The vehicle body 13 has in the front part thereof a pair of drive wheels 16 as the front wheels and in the rear part thereof a pair of steer wheels 17 as the rear wheels. The forklift truck 10 according to the present embodiment is an engine-driven forklift truck that travels by the driving force of an internal combustion engine (not shown) installed in the vehicle body 13. The vehicle body 13 includes an overhead guard 18 that covers the upper part of the operator's compartment 15.

The load-handling device 14 includes a mast assembly 21 having a pair of right and left outer masts 19 and a pair of right and left inner masts 20. The inner masts 20 are slidable relative to the outer masts 19. A pair of hydraulically-operated tilt cylinders 22 is provided between the vehicle body 13 and the outer masts 19. The tilt cylinders 22 cause the mast assembly 21 to tilt forward and rearward about the lower end portions thereof. A pair of hydraulically-operated lift cylinders 23 is mounted to the mast assembly 21. The lift cylinders 23 cause the inner masts 20 to slide up and down relative to the outer masts 19. A pair of right and left forks 24 is mounted to the mast assembly 21 through a lift bracket 25. The lift bracket 25 is slidable up and down relative to the inner masts 20. According to the present embodiment, the inner masts 20, the forks 24, and the lift bracket 25 correspond to the lifting portion of the present invention. The vehicle body 13 includes a loading pump (not shown) that supplies hydraulic oil to the lift cylinders 23 and the tilt cylinders 22. The loading pump is driven by the internal combustion engine (not shown).

A lift height sensor 26 that constantly detects or determines the lifted height of the forks 24 is mounted to the load-handling device 14. In the present embodiment a reel-type lift height sensor is used for the lift height sensor 26 for the constant detection of the lifted height of the forks 24. The reel-type lift height sensor 26 includes a wire (not shown) one end of which is connected to the forks 24, a reel about which the wire is wound, and a rotation detector (a rotary encoder) that detects the rotations of the reel. A tilt angle sensor 27 that detects the tilt angle of the mast assembly 21 is mounted to the load-handling device 14. The tilt angle sensor 27 detects the forward tilt angle when the mast assembly 21 is tilted forward and the rearward tilt angle when the mast assembly 21 is tilted rearward.

A driver's seat 28 on which the operator of the forklift truck 10 is seated is provided in the operator's compartment 15 of the vehicle body 13. The vehicle body 13 has an engine hood 29 and the driver's seat 28 is disposed on the engine hood 29. An accelerator pedal (not shown) is provided on the floor of the operator's compartment 15 for controlling the speed of the forklift truck 10. The vehicle body 13 has an accelerator pedal sensor 30 that detects the amount of depression of the accelerator pedal. The internal combustion engine is controlled so that the forklift truck 10 travels at a speed corresponding to the depression amount of the accelerator pedal.

A steering wheel 31 for steering the forklift truck 10 is provided in front of the driver's seat 28. A forward/rearward control lever (not shown) for selecting forward or rearward movement of the forklift truck 10 is provided on the left side of the steering wheel 31. A lift control lever (not shown) for operating the lift cylinders 23 and a tilt control lever (not shown) for operating the tilt cylinders 22 are provided on the right and the left sides of the steering wheel 13, respectively. The vehicle monitor 12 as the display device is located below the overhead guard 18 in the operator's compartment 15. The vehicle monitor 12 has a monitor screen such as an LCD or an organic EL display, for displaying images such as still images and moving images.

Figure 2:
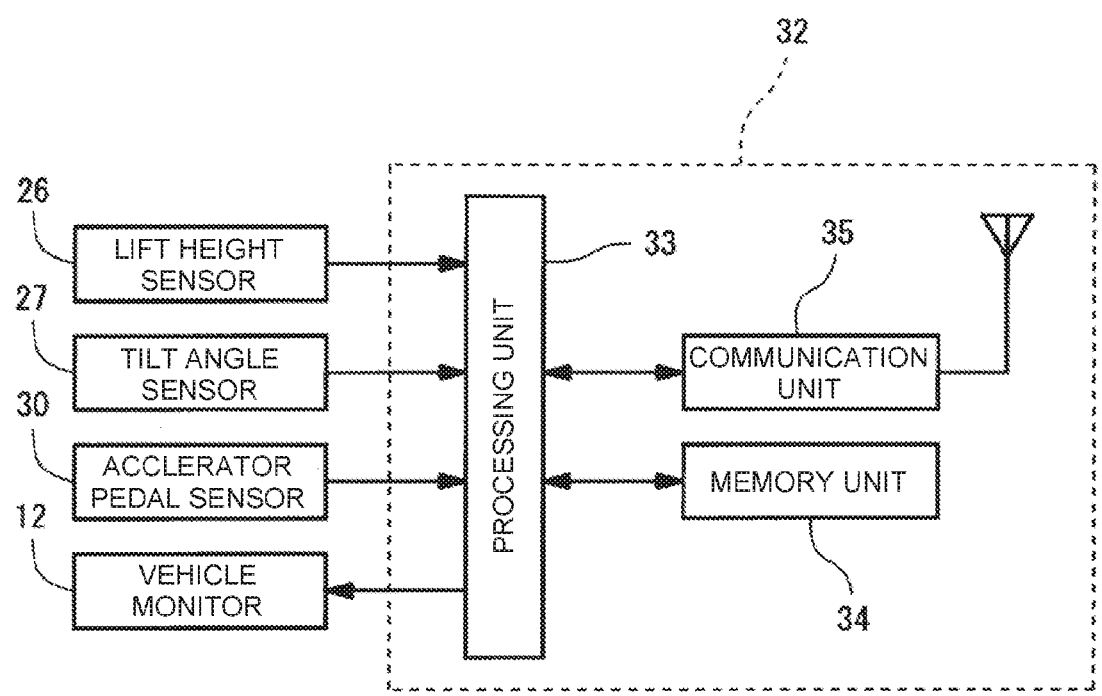
FIG. 2 is a block diagram showing control of the forklift truck of FIG. 1.

A vehicle controller 32 is disposed in the vehicle body 13. As shown in FIG. 2, the vehicle controller 32 includes a processing unit 33, and a memory unit 34 and a communication unit 35 that are electrically connected to the processing unit 33. The processing unit 33 performs processing of data, executes various programs, and controls various units or devices provided in the vehicle body 13. The data and the programs are stored in the memory unit 34. The communication unit 35 is wirelessly communicable with the rotary-wing UAS 11. The memory unit 34 stores therein a flight control program for controlling the flight of the rotary-wing UAS 11 so as to move in conjunction with the movement of the load-handling device 14.

As shown in FIG. 2, the lift height sensor 26 and the tilt angle sensor 27 are electrically connected to the processing unit 33. While the forklift truck 10 is in operation, the lift height sensor 26 constantly detects the lifted height of the forks 24 and sends detection signals indicating the lifted height of the forks 24 to the vehicle controller 32. The tilt angle sensor 27 detects the tilt angle of the mast assembly 21 and sends detection signals indicating the tilt angle to the vehicle controller 32. The vehicle monitor 12 is electrically connected to the processing unit 33, and the vehicle controller 32 transmits images such as still images and moving images to the vehicle monitor 12 to present the images on the vehicle monitor 12.

The forklift truck 10 according to the present embodiment has a landing portion 36 on the overhead guard 18 as the aircraft mounting portion of the present invention. The landing portion 36 has a flat landing surface on which the rotary-wing UAS 11 is stably placable or landable. The landing portion 36 has a power supply unit 37 for supplying electric power to the rotary-wing UAS 11. The power supply unit 37 is electrically connected to a battery (not shown) installed in the forklift truck 10 to receive electric power from the battery. According to the present embodiment, the power supply unit 37 is a contact-type power supply and controlled by the vehicle controller 32.

Figure 3:
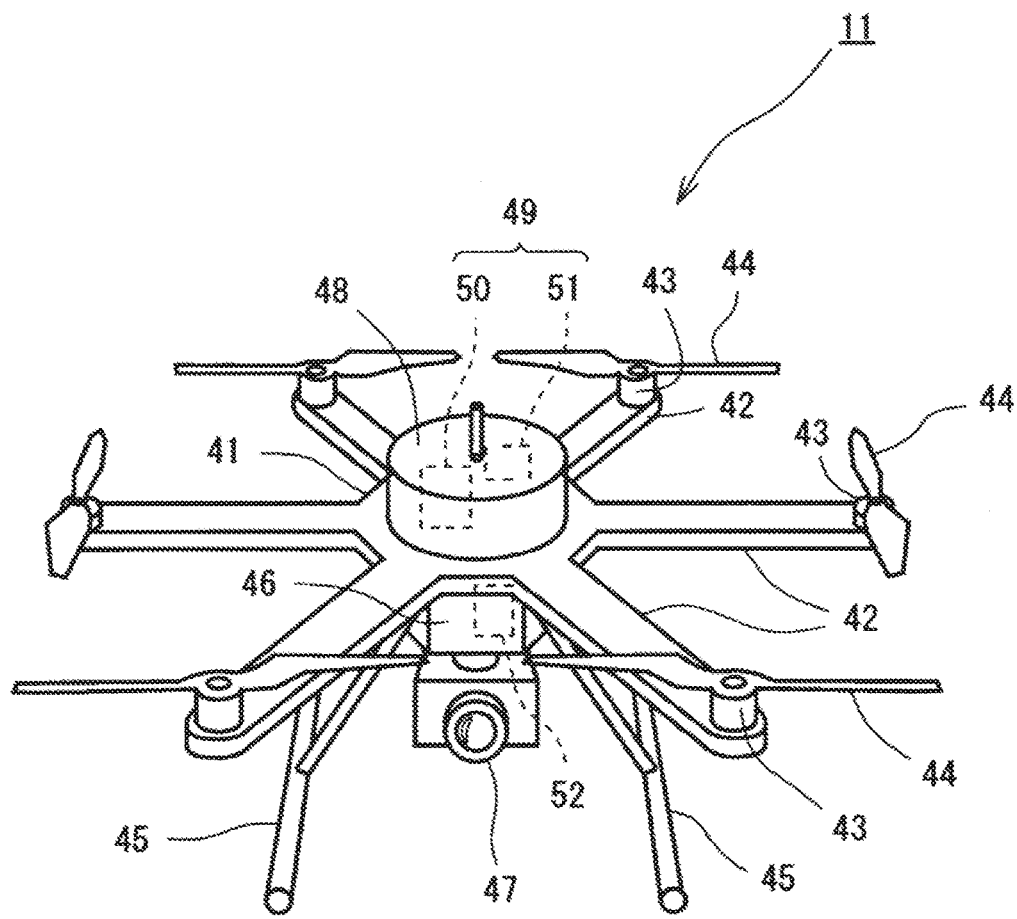
FIG. 3 is a perspective view of a rotary-wing, unmanned aircraft system according to the embodiment of the present invention.

The following will describe the rotary-wing UAS 11 as the small unmanned aerial vehicle (SUAV) of the present invention. The rotary-wing UAS 11 according to the present embodiment is a small multi-rotor helicopter that flies autonomously. As shown in FIG. 3, the rotary-wing UAS 11 includes an aircraft body 41 having a plurality of arms 42 extending in radial directions. Each arm 42 has at the end portion thereof an electric motor 43 to which a rotary blade 44 as the flight mechanism of the present invention is mounted. The rotary blade 44 is driven to rotate by the electric motor 43 to thereby generate a lift of the rotary-wing UAS 11. A pair of landing skids 45 is mounted to the underside of the aircraft body 41. The landing skids 45 support the aircraft body 41 when the rotary-wing UAS 11 is landed on the landing portion 36. According to the present embodiment, the landing skids 45 function as a contact-type power receiving unit. When the landing skids 45 are in contact with the power supply unit 37 of the landing portion 36 on the overhead guard 18, electric power is supplied from the power supply unit 37 to the rotary-wing UAS 11 through the landing skids 45. It is to be noted that, dimensions of the rotary-wing UAS 11 according to the present embodiment are determined so that the rotary-wing UAS 11 falls within the perimeter of the overhead guard 18.

The aircraft body 41 of the rotary-wing UAS 11 has in the lower center part thereof a lower casing 46 having therein a secondary battery 52 as the power storage unit of the present invention that stores electric power for driving the electric motor 43. The landing skids 45 are electrically connected to the secondary battery 52. A camera 47 as the image capture device of the present invention is mounted at a lower part of the lower casing 46. The camera 47 captures images during the flight of the rotary-wing UAS 11 and has a wide-angle lens for capturing a wide field of view and a zooming function.

The aircraft body 41 has on top and at the center thereof an upper casing 48 having therein an aircraft controller 49. The aircraft controller 49 controls various parts of the aircraft body 41 and communicates with the vehicle controller 32 in the forklift truck 10. The aircraft controller 49 includes a processing unit 50, a communication unit 51 and various sensors (not shown) that are connected to the processing unit 50. The processing unit 50 performs processing for the autonomous flight of the rotary-wing UAS 11 based on the signals sent from the sensors and controls the electric motor 43. The processing unit 50 also controls the camera 47 and transmits image data captured by the camera 47 to the vehicle controller 32 of the forklift truck 10 through the communication unit 51. The communication unit 51 of the aircraft controller 49 communicates with the communication unit 35 of the vehicle controller 32. Examples of the sensors that are connected to the processing unit 50 include but not limited to a gyroscope sensor for controlling the posture of the aircraft body 41, a three-axis accelerometer sensor, and an obstacle detection sensor. The rotary-wing UAS 11 also includes a data receiving unit (not shown) so that the rotary-wing UAS 11 autonomously locates itself, i.e., the position of the aircraft body 41, based on the location data transmitted from a beacon, an artificial satellite system or GPS.

Figure 4:
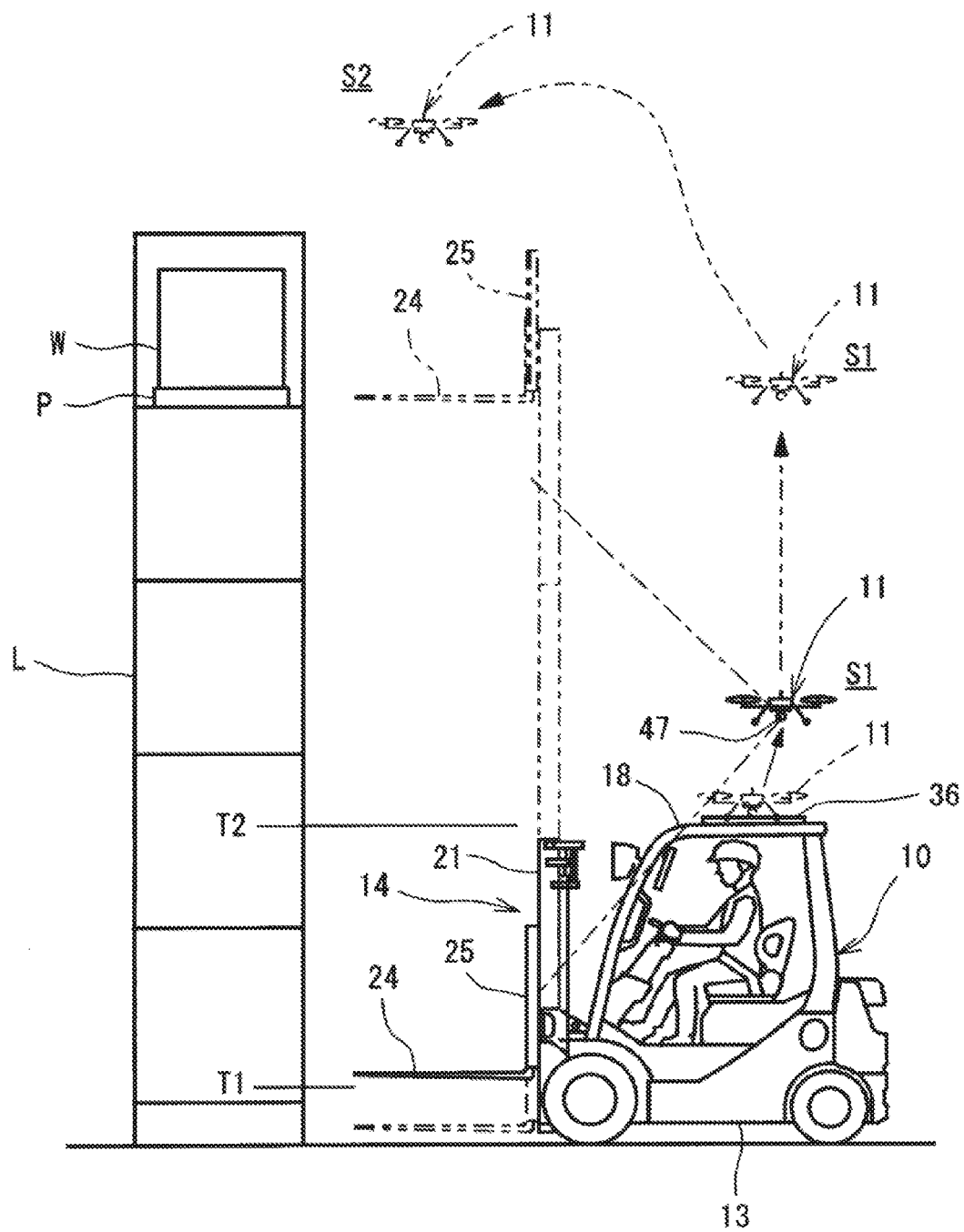
FIG. 4 is an explanatory side view illustrating a load-handling operation being assisted by the forklift operation assist system.

The load-handling operation of the forklift truck 10 assisted by the operation assist system according to the present embodiment will now be described with reference to FIG. 4. Specifically, the following will describe the load-handling operation for a load W placed on a pallet P in a multi-layer shelf L, as shown in FIG. 4. The memory unit 34 of the vehicle controller 32 stores therein a flight control program for controlling the flight of the rotary-wing UAS 11 in conjunction with the movement of the load-handling device 14. In the flight control program, a first threshold T1 and a second threshold T2, which are thresholds related to the lifted height of the lifting portion of the forklift truck 10, are determined beforehand.

As shown in FIG. 4, the threshold T1 is a threshold for causing the rotary-wing UAS 11 to take off or start to fly and also for detecting a lifting operation of the lifting portion. When the lift height sensor 26 determines that the lifted height of the forks 24 exceeds the first threshold T1, the vehicle controller 32 outputs an instruction to the rotary-wing UAS 11 to start flying and capturing images. Upon receiving the instruction from the vehicle controller 32, the rotary-wing UAS 11 takes off the landing portion 36 of the forklift truck 10 and starts flying autonomously while capturing images. Once the rotary-wing UAS 11 has started the autonomous flight, the rotary-wing UAS 11 moves to a predetermined first position S1 with reference to the position of the forklift truck 10.

Figure 5:
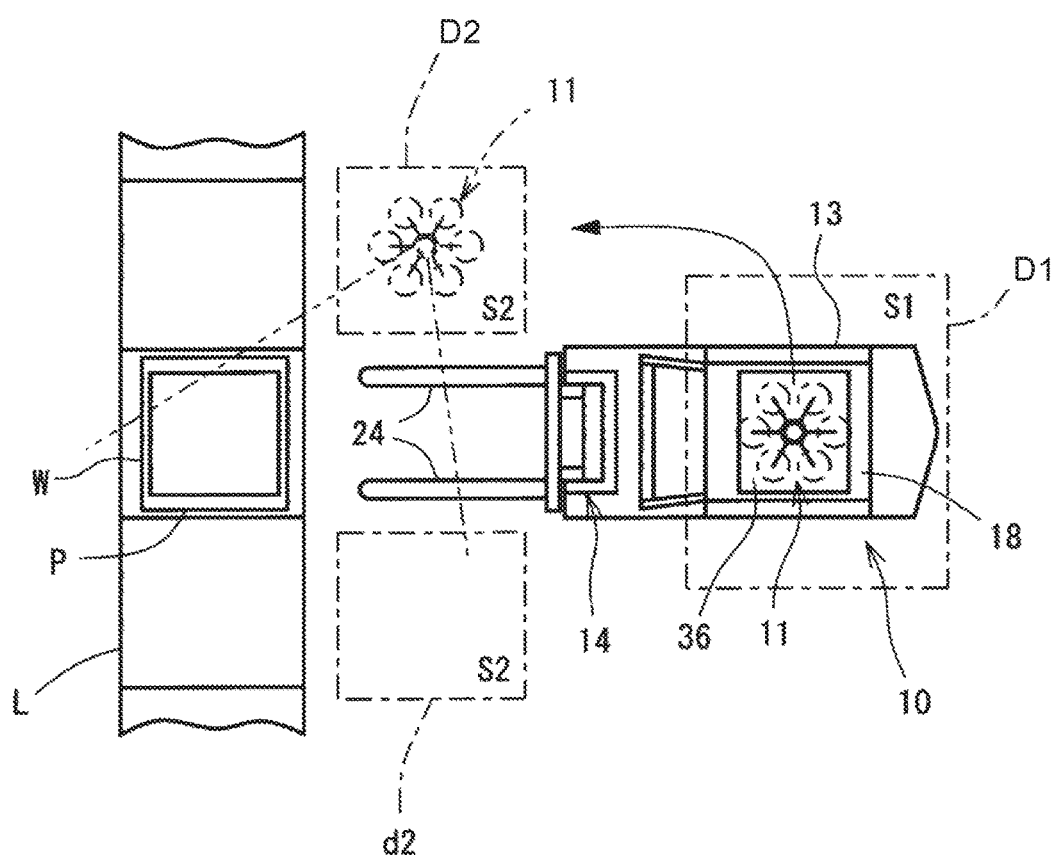
FIG. 5 is an explanatory top view illustrating the load-handling operation being assisted by the forklift operation assist system of FIG. 4.
Figure 6A:
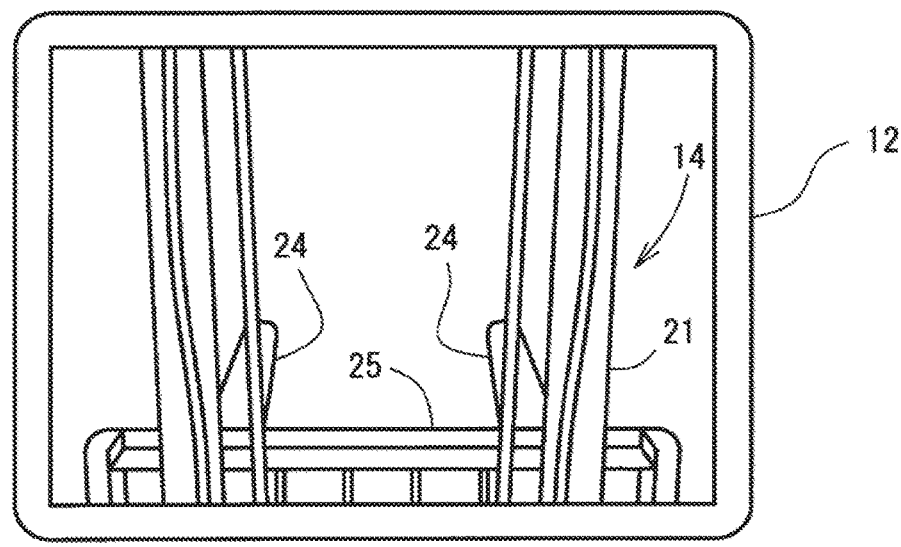
FIG. 6A is an example of an image that is captured at a first position and presented on a vehicle monitor.

According to the present embodiment, the first position S1 specifically refers to a position above the rear part of the forklift truck 10 and the vicinity thereof where images of the forks 24 and the lift bracket 25 as the lifting portion and the vicinities thereof may be captured. When the rotary-wing UAS 11 is at the first position S1, the field covered by the camera 47 includes especially the upper parts of the forks 24 and the lift bracket 25. As shown in FIG. 5, the first position S1 is located within the area enclosed by dash-dotted line D1 in a plan view. The image captured by the camera 47 at the first position S1 is transmitted to the vehicle controller 32 and presented constantly on the vehicle monitor 12. Since the first position S1 is specified with reference to the forklift truck 10, the rotary-wing UAS 11 moves with the traveling movement of the forklift truck 10. Although the absolute location of the first position S1 is variable, the relative location of the first position S1 to the forklift truck 10 is maintained substantially constant. In other words, when the forklift truck 10 travels, the rotary-wing UAS 11 moves with the forklift truck 10, and while the forklift truck is not traveling, the rotary-wing UAS 11 hovers in the air and waits for the forklift truck 10 to move. When the forks 24 are lifted, the rotary-wing UAS 11 is moved upward in conjunction with the lifting movement of the forks 24 by the control of the aircraft controller 49 that receives detection signals from the lift height sensor 26. The image captured by the flying rotary-wing UAS 11 at the first position S1 and presented on the vehicle monitor 12 helps the operator of the forklift truck 10 to determine whether or not to further lift the forks 24. The image presented on the vehicle monitor 12 in FIG. 6A is an example of the image captured by the camera 47 at the first position S1. It is to be noted that when a load W (not shown in FIG. 6A) is placed on the forks 24, the load W is also included in the image captured and presented on the vehicle monitor 12.

The second threshold T2 in FIG. 4 is a threshold for determining whether or not the forks 24 are at a higher lifted height. The second threshold T2 is specified at a lifted height at which the forks 24 and the lift bracket 25 are not easily visible to the operator of the forklift truck 10. According to the present embodiment, the second threshold T2 is specified at a position above the overhead guard 18. When the lifted height of the forks 24 detected by the lift height sensor 26 is higher than the second threshold T2, the vehicle controller 32 determines that the forks 24 are at a higher lifted height. In the load-handling operation of the forklift truck 10 to place a load W in the shelf L or take out the load W from the shelf L, the operator of the forklift truck 10 lifts the forks 24 and then moves the forklift truck 10 forward toward the shelf L or tilts the mast assembly 21 forward or rearward by manipulating the tilt control lever. According to the present embodiment, when it is detected by the accelerator pedal sensor 30 that the operator has depressed the accelerator pedal while the forks 24 are at a higher lifted height, the vehicle controller 32 then determines that the forklift truck 10 is in the load-handling operation to place or take out a load W into or from the shelf L. Further, the vehicle controller 32 also determines that the forklift truck 10 is in the load-handling operation when a change in the tilt angle of the mast assembly 21 is detected by the tilt angle sensor 27 while the forks 24 are at a higher lifted height. That is, when the forklift truck 10 is moved forward or the mast assembly 21 is tilted forward or rearward with the forks 24 located at a higher lifted height, the vehicle controller 32 determines that the forklift truck 10 is in the load-handling operation. It is to be noted that the load-handling operation to place or take out a load W into or from the shelf L by the forklift truck 10 according to the present embodiment refers to the forward movement of the forklift truck 10 toward the shelf L and the forward or rearward tilting operation of the mast assembly 21, with the forks 24 located at a higher lifted height.

When it is determined that the forklift truck 10 is in the load-handling operation with the forks 24 located at a higher lifted height, the vehicle controller 32 instructs the flying rotary-wing UAS 11 to move to a second position S2. In response to the instruction from the vehicle controller 32, the rotary-wing UAS 11 moves from the first Position S1 to the second position S2 while continuing capturing images with the camera 47. The image captured by the camera 47 at the second position S2 is transmitted to the vehicle controller 32 and presented constantly on the vehicle monitor 12. The rotary-wing UAS 11 at the second position 32 hovers in the air and waits for the forklift truck 10 to move.

Figure 6B:
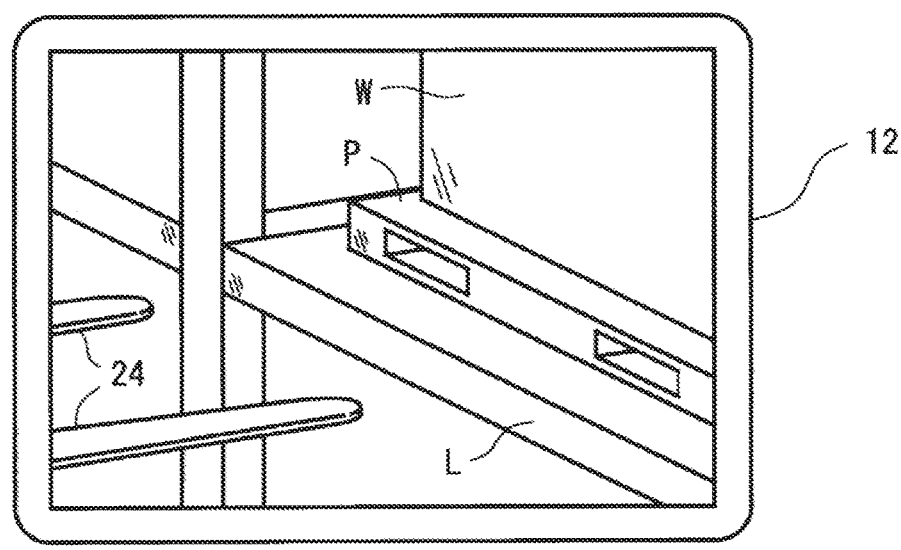
FIG. 6B is an example of an image that is captured at a second position and presented on the vehicle monitor.

According to the present embodiment, the second position S2 refers to a position that is above the forklift truck 10, forward of the vehicle body 13, and between the vehicle body 13 and the shelf L. When the rotary-wing UAS 11 is at the second position S2, the field covered by the camera 47 includes the forks 24, the lift bracket 25, and storage portion of the shelf L into or from which a load W is placed or taken out. In other words, the second position S2 enables the camera 47 to capture images of the forklift truck 10 and the shelf L in one frame of image. As shown in FIG. 5, the second position 32 is located within the area enclosed by dash-dotted line D2 in a plan view. Although FIG. 5 shows two separate areas on opposite lateral sides of the forks 24 as the second position S2, either one of the areas may preliminary be selected. The height of the second position S2 is determined based on the signal from the lift height sensor 26 and the rotary-wing UAS 11 is moved upward to the designated height. The image captured by the camera 47 at the second position S2 helps the operator of the forklift truck 10 to determine whether or not it is possible to perform the load-handling operation for the load W. The image presented on the vehicle monitor 12 in FIG. 6B is an example of the image captured by the camera 47 at the second position S2. It is to be noted that when a load W (not shown in FIG. 6B) is placed on the forks 24, the load W is also included in the image captured and presented on the vehicle monitor 12.

After the load-handling operation to place or take out a load W into or from the shelf L is finished and it is determined by the lift height sensor 26 that the forks 24 are lowered to a lifted height that is equal to or lower than the second threshold T2, the vehicle controller 32 instructs the rotary-wing UAS 11 to return to the landing portion 36 of the forklift truck 10. In response to the instruction from the vehicle controller 32, the rotary-wing UAS 11 moves toward the overhead guard 18 and returns to the landing portion 36 of the forklift truck 10. The rotary-wing UAS 11 that has landed on the landing portion 36 receives electric power from the power supply unit 37 of the forklift truck 10 through the landing skids 45 serving as the power receiving unit of the present invention, and the received electric power is stored in the secondary battery 52 of the rotary-wing UAS 11. When charging of the secondary battery 52 is completed, the vehicle controller 32 stops supplying electric power to the power supply unit 37.

The forklift operation assist system according to the present embodiment offers the following effects.

(1) When it is determined that the forks 24 are being lifted during the load-handling operation of the forklift truck 10, the rotary-wing UAS 11 takes off the forklift truck 10 and flies autonomously to the first position S1 which enables the camera 47 to capture images of the forks 24 and the vicinity of the forks 24, and the camera 47 captures images constantly while the rotary-wing UAS 11 is flying. The images captured during the flight is transmitted to the forklift truck 10 through the communication between the aircraft controller 49 and the vehicle controller 32 and presented on the vehicle monitor 12. The images of the forks 24 and its vicinity presented on the vehicle monitor 12 helps the operator of the forklift truck 10 to figure out the condition around the forks 24. Further, since the rotary-wing UAS 11 is placed on the forklift truck 10, no larger setup is necessary.

(2) In the lifting operation of the forks 24 located higher than the first threshold T1, the operator of the forklift truck 10 may determine whether or not to lift the forks 24 further by viewing the images captured by the camera 47 of the flying rotary-wing UAS 11.

(3) When any load-handling operation of the forklift truck 10 to place or take out a load W into or from the shelf L is detected with the lifted forks 24 located at a higher lifted height that is higher than the second threshold T2, the rotary-wing UAS 11 captures with the camera 47 the images of the target storage portion of the shelf L and the forks 24 in one frame of image. The operator of the forklift truck 10 is thus assisted in figuring out the positional relationship between the forks 24 and the shelf L and performing the load-handling operation easily.

(4) When the lifted height of the forks 24 is equal to or lower than the second threshold T2, the operator of the forklift truck 10 is able to visually confirm the position of the forks 24 by himself/herself, which reduces the necessity for using the rotary-wing UAS 11 to capture images. Accordingly, by returning the rotary-wing UAS 11 to the forklift truck 10 when the lifted height of the forks 24 is equal to or lower than the second threshold T2, excessive consumption of energy for driving the rotary-wing UAS 11 is prevented.

(5) The rotary-wing UAS 11 as placed on the landing portion 36 on the overhead guard 18 receives power from the battery on the forklift 10 through the power supply unit 37 of the landing portion 36 and the landing skids 45 of the rotary-wing UAS 11. It is to be noted that the battery (not shown) on the forklift truck 10 is charged by driving of the internal combustion engine (not shown) in the vehicle body 13.

(6) According to the present embodiment, the camera 47 that is mounted on the rotary-wing UAS 11 is free from vibration or impact of the forklift truck 10 in operation and hence less susceptible to contamination and damage, and easy for maintenance, as compared with a configuration in which the camera is fixed on the forklift truck. Further, because the camera 47 is mounted on the rotary-wing UAS 11, clear and precise images are obtained.

It is to be noted that the present invention is not limited to the above embodiment and it may variously be modified within the scope of the invention, as exemplified below.

According to the above embodiment, the rotary-wing unmanned aircraft system was described as one example of the small unmanned aerial vehicle (SUAV). However, the type of the small unmanned aerial vehicle (SUAV) is not limited to the rotary-wing unmanned aircraft system and may be a fixed-wing unmanned aircraft system or an unmanned airship, for example.

According to the above embodiment, the aircraft landing portion 36 for the rotary-wing UAS 11 is provided on the overhead guard 18 of the forklift truck 10. However, the position of the landing portion 36 is not particularly limited thereto and may be provided, for example, on the counterweight of the forklift truck 10 or at any places in the forklift truck 10 as long as such placement of the rotary-wing UAS 11 does not affect the functionality of the forklift truck 10.

According to the above embodiment, it is determined by the vehicle controller 32 that the forklift truck 10 is in the load-handling operation to place or take out a load W into or from the shelf L when the forklift truck 10 is moved forward or the mast assembly 21 is tilted forward or rearward while the forks 24 are located at a higher lifted height. However, such determination may be made based on the lateral movement or rotation of the lift bracket 25 depending on the type of the load-handling device or attachment. In this case, a sensor for detecting the lateral movement or rotation of the lift bracket 25 needs to be provided. It is to be noted that the load-handling operation of the forklift truck 10 with the forks 24 located at a higher lifted height is an example of the operations that are performed in the course of placing a load W into the shelf L or taking out the load W from the shelf L after the forks 24 are lifted or lowered.

According to the above embodiment, a vehicle monitor 12 is provided in the operator's compartment as the display device. According to the present invention, however, the display device is not particularly limited to the vehicle monitor 12 and it may be any device as long as it is configured to present images in the operator's compartment of the forklift truck 10 so that the operator can view the presented image. For example, the display device may be a head-mountable display including a headband to be worn on the operator's head and a transparent display portion on which captured images are projectable and through which the operator still sees the real world environment surrounding the operator. Alternatively, the display device may be an optical head-mountable display on which captured images are projectable and through which the operator still sees the real world environment surrounding the operator. In this case, a unit through which the display device and the vehicle controller are communicable with each other needs to be provided.

According to the above embodiment, the lift height sensor 26 is used to detect the lifting operation of the lifting portion. However, the unit for detecting the operation of the lifting portion is not limited to the lift height sensor 26 and, for example, a lift control lever angle sensor that detects the operated position of the lift control lever may alternatively be used. Further, instead of the reel-type lift height sensor 26, any type of sensors may be used as long as it is configured to detect the lifted height of the forks 24. For example, an optical lift height sensor that detects the lifted height of the forks 24 using a reflection panel and an optical sensor may be used.

According to the above embodiment, the power supply unit 37 of the forklift truck 10 supplies electric power to the landing skids 45 as the contact type power receiving unit of the rotary-wing UAS 11. According to the present invention, however, electric power may be supplied in a contactless manner using a contactless type power supply unit and a contactless type power receiving unit. Further, although the forklift truck 10 of the above embodiment is powered by an engine, the type of the forklift truck is not particularly limited and a battery-powered forklift truck or a fuel cell-powered forklift truck may also be used.

In the above embodiment, no particular description is given to the processing of the images captured by the camera 47 while the rotary-wing UAS 11 is flying. However, it may be so configured that the images captured by the camera 47 is presented as it is on the vehicle monitor 12 without being processed. Further, it may be so configured that, in the case that the operator of the forklift truck 10 desires to view a particular part of a captured image, the desired part is trimmed and presented on the vehicle monitor 12. Further, the images presented on the vehicle monitor 12 may be magnified using a zoom function of the camera 47.

According to the above embodiment, the first position S1 is determined beforehand as the position which enables the camera 47 to capture images of the lifting portion including the forks 24 and the vicinity thereof, and the second position S2 is determined beforehand as the position which enable the camera 47 to capture images of the forklift truck 10 and a storage portion of the shelf into or from which a load W is placed or taken out in one frame of image. However, the locations of the first and second positions S1 and S2 may be changed appropriately according to the preference or the physical characteristics of the operator or the like. Alternatively, a plurality of first positions S1 and a plurality of second positions S2 may be determined beforehand in the case that the forklift truck 10 is used by a plurality of operators. In this case, the best suitable first and second positions S1 and S2 may be selected for each of the operators of the forklift truck 10.

According to the above embodiment, after the rotary-wing UAS 11 takes off the landing portion 36 of the forklift truck 10, the rotary-wing UAS 11 moves to the first position S1, and when it is determined that the forklift truck 10 is in the load-handling operation to place or take out a load W into or from the shelf L with the forks 24 located at a higher lifted height, the rotary-wing UAS 11 moves from the first position S1 to the second position S2. According to the present invention, however, the configuration is not limited thereto and it may be configured such that the rotary-wing UAS 11 after taking-off the landing portion 36 circles around the forklift truck 10 before moving to the first position S1, or circles around the forklift truck 10 before moving from the first position S1 to the second position S2. By allowing the rotary-wing UAS 11 to circle around the forklift truck 10 before moving to the respective first and second positions S1 and S2, the operator of the forklift truck 10 can grasp the condition around the forklift truck 10 through the vehicle monitor 12.

What is claimed is:

1. A forklift operation assist system comprising:
    a forklift truck having a load-handling device with a lifting portion;
    a small unmanned aerial vehicle that is mountable on the forklift truck and has an image capture device; and
    a display device that presents images captured by the image capture device,
    wherein the forklift truck includes a vehicle controller that is electrically connected to the display device, and
    the small unmanned aerial vehicle includes an aircraft controller that communicates with the vehicle controller, and
    wherein the small unmanned aerial vehicle takes off the forklift truck when a lifting operation of the lifting portion is detected, and
    the display device presents the images captured by the image capture device while the aerial vehicle is flying.

2. The forklift operation assist system according to claim 1, wherein when a lifted height of the lifting portion exceeds a predetermined first threshold, the small unmanned aerial vehicle takes off the forklift truck.

3. The forklift operation assist system according to claim 1, wherein
    when it is determined that the forklift is in a load-handling operation to place or take out a load into or from a shelf with a lifted height of the lifting portion located higher than a predetermined second threshold, the small unmanned aerial vehicle moves to a position which enables capturing of images that include the shelf and the lifting portion in one frame of image.

4. The forklift operation assist system according to claim 3, wherein
when it is detected that the lifted height of the lifting portion that is located higher than the second threshold has become equal to or lower than the second threshold, the small unmanned aerial vehicle returns to the forklift truck.

5. The forklift operation assist system according to claim 1, wherein
an overhead guard of the forklift truck is provided with an aircraft mounting portion on which the small unmanned aerial vehicle is mountable,
the aircraft mounting portion has a power supply unit that supplies electric power to the small unmanned aerial vehicle, and
the small unmanned aerial vehicle includes a flight mechanism that is driven by an electric motor, a power storage unit, and a power receiving unit that receives electric power from the power supply unit.

* * * * *